US006453086B1

(12) United States Patent
Tarazona

(10) Patent No.: US 6,453,086 B1
(45) Date of Patent: *Sep. 17, 2002

(54) PIEZOELECTRIC OPTICAL SWITCH DEVICE

(75) Inventor: Eric P. Tarazona, Saint Maurice de Remens (FR)

(73) Assignee: Corning Incorporated, Corning, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/519,116

(22) Filed: Mar. 6, 2000
(Under 37 CFR 1.47)

(51) Int. Cl.[7] ................................. G02B 6/26

(52) U.S. Cl. .......................... 385/20; 385/22

(58) Field of Search .............. 385/4, 42, 16, 385/20, 21, 48

(56) References Cited

U.S. PATENT DOCUMENTS

| 4,786,130 A | * 11/1988 | Gergious et al. |
| 5,313,535 A | 5/1994 | Williams |
| 5,502,781 A | 3/1996 | Li et al. |
| 5,920,663 A | 7/1999 | Dragone |
| 6,052,393 A | * 4/2000 | Islam |

OTHER PUBLICATIONS

Inoue, Y. et al.; Polarization Sensitivity off a Silica Waveguide Thermooptic Phase Shifter for Planar Lightwave Circuits; IEEE Photonics Technology Letters, vol. 4, No. 1, Jan. 1992.

Okuno, M. et al; Birefringence Control of Silica Waveguides on Si and Its Application to a Ploarization–Beam Splitter/Switch; IEEE Journal of Lightwave Technology, vol. 12, No. 4, Apr. 1994.

Donati, S.; Piezoelectric Actuation of Silica–On–Silicon Waveguide Devices; IEEE Photonics Technology Letters, vol. 10, No. 10; Nov. 1998.

* cited by examiner

Primary Examiner—Hung N. Ngo
(74) Attorney, Agent, or Firm—Gregory V. Bean

(57) ABSTRACT

A piezoelectric optical switch includes a planar Mach-Zehnder optical device having a piezoelectric rib disposed on one or both of the waveguide structures. The piezoelectric rib deforms the waveguide structure creating a strain vector that alters the optical path of the waveguide. The piezoelectric rib is offset from the propagation path in the waveguide. This yields several important advantages. By positioning the piezoelectric rib away from the waveguide, the strain components in the propagation path of the waveguide in the directions perpendicular to the direction of propagation, e.g., in the x-direction and the y-direction, are negligible. Since strains in these directions create birefringence, elimination of these strains will minimize the birefringence. The elimination or reduction of birefringence is greatly desired because birefringence degrades the extinction ratio at the outputs of the Mach-Zehnder device. Thus, the piezoelectric switch of the present invention provides a high extinction ratio and a low power consumption and small switching time expected of piezoelectric devices.

67 Claims, 12 Drawing Sheets

Top electrode 42 deposition

Top electrode 42 patterning (photolithography and etching)

PZT 40 patterning (wet etching)

Bottom electrode 44 patterning (photolithography and etching)

Contact electrode deposition and patterning (photolithography and etching)

18 Pigtailing

108 Packaging

PIEZOELECTRIC OPTICAL SWITCH DEVICE

BACKGROUND OF THE INVENTION

1. Field of the Invention

The present invention relates generally to piezoelectric optical switches, and particularly to planar Mach-Zehnder piezoelectric optical switches having low birefringence and a high extinction ratio.

2. Technical Background

As the demand for bandwidth increases, so does the drive toward intelligent, low-cost, and dynamically-reconfigurable fiber optic networks. To bring this to pass, network designers are seeking ways to replace certain network functions that were traditionally performed in the electrical domain with solutions in the optical domain, as economics and system designs permit. Designers have recognized for quite some time that four port optical devices could find widespread application in fiber networks to provide fault tolerance, signal modulation, and signal routing. Integrated optical devices using either thermo-optical or electro-optical techniques are currently available. However, these devices have drawbacks due to high power consumption and low switching speeds.

Four-port piezoelectric optical devices are of particular interest because of their lower power consumption, reduced switching time and adaptability to mass production techniques, such as photolithography. One approach that has been considered involves an optical phase modulator fabricated by coating a fiber with a thick coaxial piezoelectric lead zirconate titanate film. This circular symmetric in-line fiber phase modulator provides phase modulation in a frequency range from 100 kHz to 25 MHz. Unfortunately, the efficiency of the device was poor as it exhibited high attenuation and low piezoelectricity because of difficulty of depositing a thick PZT film around an optical fiber.

In another approach that has been considered, a Mach-Zehnder fabricated from optical fibers was used to construct an optical switch. In this design, each optical fiber leg was positioned directly on a piezoelectric strip. This design also has several drawbacks. First, the piezoelectric strip required high voltage for commutation. Second, the positioning of the strip in relation to the fiber created asymmetrical stresses along the fiber axis that perturbed the polarization in the interferometer arms resulting in high birefringence and degraded cross-talk performance. As a consequence, polarized light is required when using this switch.

In yet another approach, a modulator was fabricated by laminating a piezoelectric strip on a planar waveguide device. The piezoelectric strip was formed by sandwiching a layer of piezoelectric material between a lower electrode and an upper electrode. The piezoelectric strip was then attached to the overclad of the device directly above the waveguide. However, when the piezoelectric strip was actuated, the resulting strain vector generated a strong birefringence effect that severely degraded the extinction ratio at the output of the device.

Thus, a need exists for a four port piezoelectric optical device having reduced birefringence characteristics, a high extinction ratio, lower power consumption, and reduced switching time. This switch must be cost effective, and its design suitable for mass production techniques.

SUMMARY OF THE INVENTION

The present invention is a four port piezoelectric optical switch that substantially solves the birefringence problem and addresses the other issues discussed above. In doing so, the piezoelectric switch of the present invention provides a high extinction ratio in addition to the lower power consumption and reduced switching time possible with piezoelectric switch technology. The planar design of the present invention is well suited for mass production techniques such as photolithography, and offers a promising low-cost solution for some of the signal routing and fault tolerance functionality needed to implement an intelligent fiber optic network.

One aspect of the present invention is an optical device for selectively directing a light signal in a direction of propagation, the optical device includes a propagation path for the light signal and an output. The optical device includes a piezoelectric element for directing the light signal into the output by creating a plurality of mutually orthogonal strain components in the optical device, wherein the piezoelectric element is disposed relative to the propagation path such that only a component of the plurality of mutually orthogonal strain components, aligned in the direction of propagation, may substantially exist in the propagation path.

In another aspect, the present invention is a Mach-Zehnder optical device for directing a light signal having a wavelength λ in a direction of propagation. The optical device includes: a first waveguide having a first propagation path, a refractive index n, a first length $L_1$, and a first output, wherein the light signal is propagated along the first propagation path; and a first piezoelectric rib for directing the light signal by creating a first plurality of mutually orthogonal strain components in the first waveguide, wherein the first piezoelectric rib is disposed on the first waveguide at a first offset from the first propagation path such that only a component of the first plurality of mutually orthogonal strain components that is aligned in the direction of propagation substantially may exist in the first propagation path.

In another aspect, the present invention is a method for directing a light signal having a wavelength λ, in a direction of propagation in an optical device including a first waveguide having a first propagation path, a refractive index n, a first length $L_1$, and a first output, wherein the light signal is propagated along the first propagation path. The method for directing a light signal includes the steps of: providing a first piezoelectric rib for generating a first plurality of mutually orthogonal strain components in the first waveguide, wherein the first piezoelectric rib is disposed on the first waveguide at a first offset from the first propagation path such that only a component of the first plurality of mutually orthogonal strain components that is aligned in the direction of propagation can substantially exist in the first propagation path; providing a second waveguide disposed adjacent to the first waveguide having a second propagation path, the refractive index n, a second length $L_2$, and a second output; and actuating the first piezoelectric rib to selectively deform the first waveguide, wherein a first waveguide deformation produces the first plurality of mutually orthogonal strain components in the first waveguide.

In another aspect, the present invention discloses a method of fabricating an optical device used for directing a light signal. The method of fabricating includes the steps of: forming a substrate; disposing a waveguide core layer on the substrate; forming a first waveguide from the waveguide core layer, wherein the first waveguide structure is characterized by a first propagation path, a refractive index n, a first length $L_1$, and a first axis, wherein the first axis is substantially perpendicular to the first length and the first propagation path; forming a second waveguide structure from the waveguide core layer, wherein the second waveguide structure is characterized by second propagation path, the refractive index n, a second length $L_1$, and a second axis parallel to the first axis; disposing a first piezoelectric rib on the first waveguide structure, wherein the first piezoelectric rib has a first rib axis which is substantially parallel to the first axis and separated from the first axis by an offset; and disposing a second piezoelectric rib on the second waveguide structure, wherein the second piezoelectric rib has a second rib axis which is substantially parallel to the second axis and separated from the second axis by the offset, wherein the offset is selected to minimize a birefringence in the optical device.

In another aspect, the present invention discloses a method for selectively directing a light signal into a first output or a second output of an optical device that includes at least one waveguide having at least one core connected to the first output, wherein the light signal propagates along the at least one waveguide in a direction of propagation, the method for selectively directing a light signal comprising the steps of: providing at least one piezoelectric element for switching the light signal from the first output into the second output by inducing a plurality of mutually orthogonal strain components in the at least one waveguide, the at least one piezoelectric element being disposed on the at least one waveguide in a predetermined position such that only a first component of the plurality of mutually orthogonal strain components substantially exists in the at least one core, wherein the first component is a strain component aligned to the direction of propagation; and actuating the at least one piezoelectric element to thereby generate a deformation in the at least one waveguide causing the plurality of mutually orthogonal strain components to be produced in the at least one waveguide.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
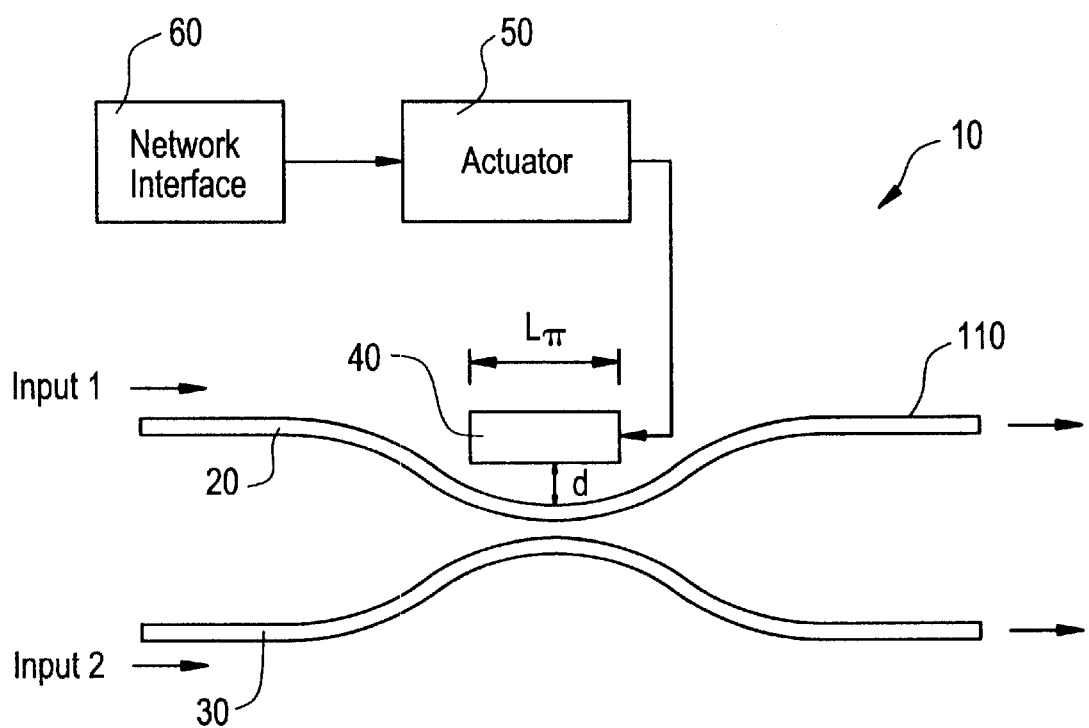
FIG. 1 is a schematic of a piezoelectric optical switch according to a first embodiment of the present invention.

Reference will now be made in detail to the present preferred embodiments of the invention, example of which are illustrated in the accompanying drawings. Wherever possible, the same reference numbers will be used throughout the drawings to refer to the same or like parts. An exemplary embodiment of the piezoelectric optical switch of the present invention is shown in FIG. 1, and is designated generally throughout by reference numeral 10.

In accordance with the present invention, an optical device 10 for directing a light signal into a desired output includes a piezoelectric rib 40. Piezoelectric rib 40 directs the light signal by deforming the core of a at least one waveguide to thereby alter the optical path length. The deformation creates a three-dimensional strain vector having components in each dimension x, y, and z, of a cartesian coordinate system. The z-direction corresponds to the direction of propagation. By positioning the piezoelectric rib 40 on a waveguide at a predetermined offset position from the core, the strain components that are orthogonal to the direction of propagation, x and y, can be reduced to a negligible level. Since strains in these directions create bifringence, a reduction in these strains will also effect a reduction of the bifringence, as well. The only remaining strain is in the direction of propagation, and strain in the z-direction does not create bifringence. The elimination or reduction of bifringence is greatly desired because bifringence degrades the extinction ratio at the output of the optical device 10.

Thus, by solving the birefringence issue, the present invention provides an optical switch that has a high extinction ratio. Another benefit of the present invention is its low power consumption and fast switching time, due to the piezoelectric effect. In addition, the planar design of the present invention is well suited for mass production techniques such as photolithography and thus, offers a promising low-cost solution for some of the signal routing and fault tolerance functionality needed in implementing an intelligent fiber optic network.

As embodied herein, and depicted in FIG. 1, a schematic of a piezoelectric optical switch 10 according to a first embodiment of the present invention includes a planar directional coupler 100 formed by waveguide 20 and waveguide 30. A piezoelectric rib 40 is disposed on waveguide structure 20 at a predetermined offset distance "d" away from waveguide core 22 (see FIG. 2). Piezoelectric rib 40 has a length $L\pi$, a distance sufficiently long enough to produce a $\pi$ radian phase difference between waveguide 20 and waveguide 30.

Figure 2:
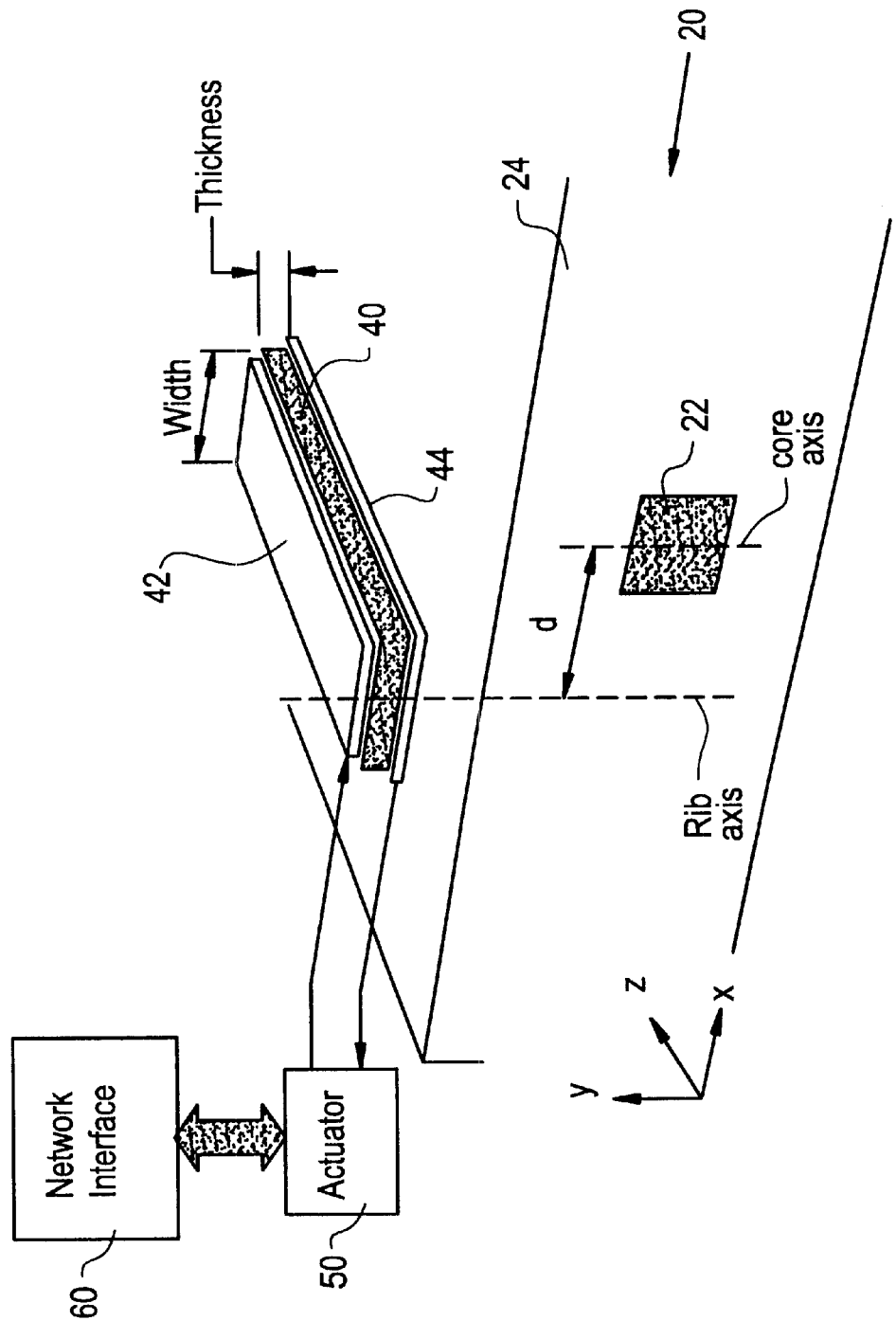
FIG. 2 is a detail view of the placement of a piezoelectric rib on a waveguide structure in accordance with the present invention.

As embodied herein, and depicted in FIG. 2, a detail view of the placement of piezoelectric rib 40 on waveguide structure 20 in accordance with the present invention is disclosed. A rectangular coordinate system is provided in FIG. 2 as a convenient means of describing element orientation and will be used throughout. Piezoelectric rib 40 includes an upper electrode 42 and a lower electrode 44. Electrodes 42 and 44 are connected to actuator 50. Piezoelectric rib 40 is disposed on overclad 24 of the waveguide structure 20 an offset distance "d" from the waveguide axis which bisects waveguide core 22. Waveguide structure 20 includes overclad 24 and core 22. Note that the direction of propagation is in the z-direction.

Waveguide structure 20 and waveguide structure 30 may be of any suitable well-known type, but there is shown by way of example a waveguide fabricated using silica glass with a refractive index of approximately 1.45. One of ordinary skill in the art will appreciate that polymers and other like materials may be used. The geometric shape of core 22 may be either square, rectangular, trapezoidal, or semi-circular. The dimensions of the core are dependent on the wavelength of the signal light and are designed to ensure that the waveguide is single mode at the signal wavelength. Core 22 is covered by overclad 24 having a thickness that is designed to confine the mode and limit propagation losses.

Piezoelectric rib 40 may be of any suitable well-known type, but there is shown by way of example, a layer of lead zirconate titanate(PZT) or zinc oxide(ZnO), having a thickness in an approximate range of between 3 µm to 300 µm, a width in an approximate range of between 20 µm to 300 µm, and a length in an approximate range of between 2 mm to 3 cm. The variation in the dimensions of the piezoelectric rib are dependent upon several factors, including the amount of phase shift piezoelectric rib 40 is required to produce. Piezoelectric rib 40 is produced by spin coating deposition of a PZT or ZnO sol-gel solution and annealing. A more detailed discussion of the dimensions and placement of piezoelectric rib 40 will be presented subsequently.

Actuator 50 may be of any suitable well-known type, but there is shown by way of example, a voltage source capable of supplying two discrete voltages to piezoelectric rib 40. The first discrete voltage is on the order of a few volts. The exact voltage depends upon the required phase shift. The second voltage level is approximately ground. As one of ordinary skill in the art will appreciate, Mach-Zehnders with perfect 3 dB couplers do not exist in practice. Thus, the actual voltage that actuator 50 supplies to piezoelectric rib 40 may include a bias voltage to compensate for the small phase variations generated by imperfections in the Mach-Zehnder. This "tuning" can done permanently by UV exposure of the waveguide to perfect the desired phase difference.

The network interface 60 allows optical device 10 to be adaptable to any network environment in terms of line levels and logic protocol. Network interface 60 may also be configured to send fault information back to the network.

The operation of optical device 10 according to the first embodiment of the present invention as depicted in FIGS. 1 and 2, is as follows. In a first actuation state, the network interface receives a command to direct the light signal to the output of waveguide 30. Network interface 60 drives actuator 50 and piezoelectric rib 40 is de-energized. A light signal is directed into directional coupler 100 as shown, and signal power is transferred into waveguide 30. In a second state, the network interface receives a command directing optical device 10 to direct all of the light signal into the output of waveguide 20. In response, network interface 60 drives actuator 50 to supply piezoelectric rib 40 with the appropriate voltage. Piezoelectric rib 40 expands and deforms waveguide structure 20 to induce a strain in waveguide 20. The induced strain caused by the deformation will cause the refractive index and the length of waveguide 20 to change. Both of these factors contribute to a change in the optical path length in waveguide 20. A $\pi$ radian phase difference between waveguide 20 and waveguide 30 is established and light no longer couples into waveguide 30. As a result, optical device 10 is switched and the light signal exits device 10 from waveguide 20. As discussed above one of ordinary skill in the art will appreciate that the voltage amount depends on the amount of strain required to produce an index variation that will generate the desired phase difference.

The operating principles of the present invention that establish the relationship between the dimensions, power requirements, and positioning of piezoelectric rib 40 with respect to deformation, strain and the resulting phase shift induced in waveguides 20 and 30 are as follows. If $E_{in}$ is the field of the input light signal, $\Delta\Phi$ the phase difference between waveguides 20 and 30, and $E_{out}$ the field of the output signal, one has the following relationship:

$$E_{out} = j\frac{E_{in}}{2}(1 + e^{j\Delta\Phi}) \quad (1)$$

The transmission of Mach-Zehnder 100 is defined as the ratio of the output intensity over the input intensity. Thus, from equation (1) we have:

$$T = \frac{I_{out}}{I_{in}} = \frac{1 + \cos(\Delta\Phi)}{2} \quad (2)$$

The phase difference $\Delta\Phi$ between waveguide 20 and 30 is expressed as:

$$\Delta\Phi = \frac{2\pi d(nL)}{\lambda} = \frac{2\pi L}{\lambda}\left(n\frac{dL}{L} + dn\right) \quad (3)$$

wherein $\lambda$ is the wavelength, n is the effective index of the mode propagating in the device 10, and L is the length of waveguides 20 and 30 between coupler 112 and coupler 114. The term d(nL) is the difference of nL between waveguide 20 and waveguide 30.

As discussed above, when actuator 50 applies a voltage to piezoelectric rib 40, it expands or contracts, depending on the magnitude and polarity of the voltage. The expansion and contraction of piezoelectric rib 40 deforms waveguide 20 and causes a change in its refractive index and length. The index variation is related to strain by the following expression:

$$dn_x = -\frac{n^3}{2}(p_{11}\varepsilon_x + p_{12}\varepsilon_y + p_{12}\varepsilon_z) \quad (4)$$

$$dn_y = -\frac{n^3}{2}(p_{12}\varepsilon_x + p_{11}\varepsilon_y + p_{12}\varepsilon_z) \quad (5)$$

wherein $n_x$ is the refractive index for light polarized in the x-direction (see FIG. 3), $n_y$ is the refractive index for light polarized in the y-direction, $\varepsilon_x$, $\varepsilon_y$, and $\varepsilon_z = dL/L$ are mutually orthogonal strain components in the x, y, and z directions, respectively. The terms $p_{11}$ and $p_{12}$ are photoelastic coefficients and vary depending on the material used to fabricate the waveguide. The phase difference $\Delta\Phi$ between waveguide 20 and 30 is generally different for the polarization components of the light signal in the x-direction and in the y-direction, thus:

$$\Delta\Phi_x = \frac{2\pi L}{\lambda}\left(-\frac{n^3}{2}\cdot p_{11}\varepsilon_x - \frac{n^3}{2}\cdot p_{12}\varepsilon_y - \left[\frac{n^3}{2}p_{12} - n\right]\varepsilon_z\right) = \frac{2\pi L}{\lambda}K_x \quad (6)$$

$$\Delta\Phi_y = \frac{2\pi L}{\lambda}\left(-\frac{n^3}{2}\cdot p_{12}\varepsilon_x - \frac{n^3}{2}\cdot p_{11}\varepsilon_y - \left[\frac{n^3}{2}p_{12} - n\right]\varepsilon_z\right) = \frac{2\pi L}{\lambda}K_y \quad (7)$$

From equations (6) and (7), the length of piezoelectric rib 40 required to produce a $\pi$ radian phase difference can be calculated:

$$L_\pi = \frac{\lambda}{K_x + K_y} \quad (8)$$

Depending on the material used and the wavelength of the light signal, $L_\pi$ has an approximate range of 2 mm and 3 cm. The acceptable range of widths and thicknesses of piezoelectric rib 40 are determined by comparing the strain in the direction of propagation $\varepsilon_z$, with PZT ribs having various widths and thicknesses, and waveguide structures having different overclad thicknesses. Thus, for acceptable results, the thickness of the piezoelectric rib 40 has an approximate range of 3 µm–300 µm and its width has an approximate range of 20 µm–300 µm. The depth of overclad depends on the signal wavelength and must be enough to confine the mode and limit propagation losses.

From equations (6) and (7) the polarization dependency of the phase difference due to the birefringence, is also evident. The main effect of the birefringence is to lower the extinction ratio. The extiction ratio refers to the ratio of light in the output of waveguide 20, for example, in the "ON" state versus the "OFF" state. Theoretically, there should be no light exiting waveguide 20 in the "OFF" state. Thus the extinction ratio is a measure of light leakage. Obviously, the output of waveguide 30 could also be used to take the measurement. If the extinction ratio is low, it means that there is an excessive amount of light leaking out of device 10 from the output of a waveguide that is supposed to be turned off. By lowering the birefringency of the device, one also improves the extinction ratio.

Figure 3:
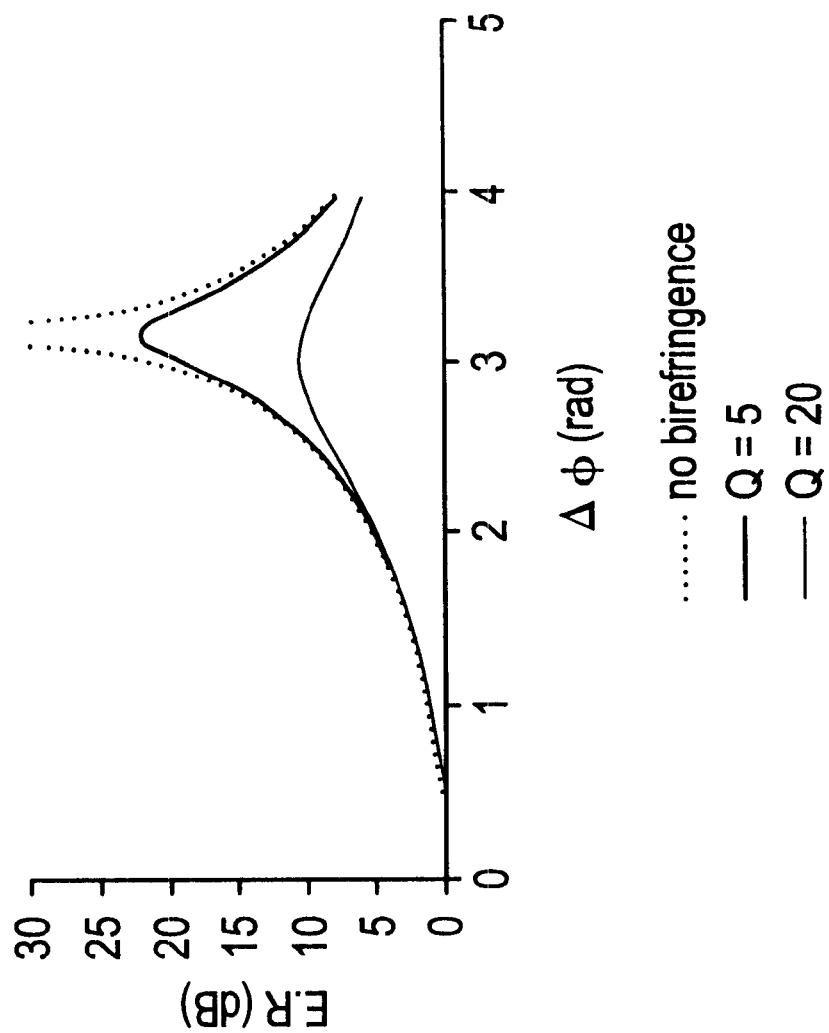
FIG. 3 is a schematic of a piezoelectric optical switch according to a second embodiment of the present invention.

FIG. 3 is a chart showing the relationship between birefringence and the extinction ratio. One measure of birefringence is the Q-value. The top curve shows a non-birefringent Mach-Zehnder which corresponds to an infinite Q-value. The bottom curve shows a device having an extinction ratio of 10 dB which corresponds to a Q-value of about five. The Q-value must be higher than 16 to obtain a minimum extinction ratio of 20 dB. The Q-value is related to the difference in refractive indices for both polarizations by the expression:

$$Q = \frac{dn_x + dn_y}{dn_x - dn_y} \quad (9)$$

The parameters $dn_x$ and $dn_y$ are index variations produced by stresses induced by the piezoelectric rib 40. Equations (6) and (7) indicate that the change in the length of the waveguide dL/L and the index variation induced by the deformation compensates for strain in the direction of propagation, $\varepsilon_z$. Thus, birefringence can be significantly minimized by eliminating strain components $\varepsilon_x$ and $\varepsilon_y$ in the x and y-directions, respectively. This is accomplished by the present invention by disposing piezoelectric rib 40 at a predetermined offset distance from the central axis of core 22 (see FIG. 3) and the path of propagation. At the time of actuation, the geometric position of the piezoelectric rib acts to minimize strain components $\varepsilon_x$ and $\varepsilon_y$; however, switching functionality is retained by using $\varepsilon_z$ to vary the index and the length of the waveguide.

The optimum range for the offset distance was determined by mapping the Q-value (inversely proportional to birefringence) as a function of the offset distance using a Mach-Zehnder having a PZT rib having length $L_\pi$, a width of approximately 100 µm, and a thickness of 20 µm. Under these conditions the optimal value for the offset distance in this configuration is approximately 100 µm. Generally speaking, the offset distance is approximately equal to $\lambda/4n$.

Figure 4:
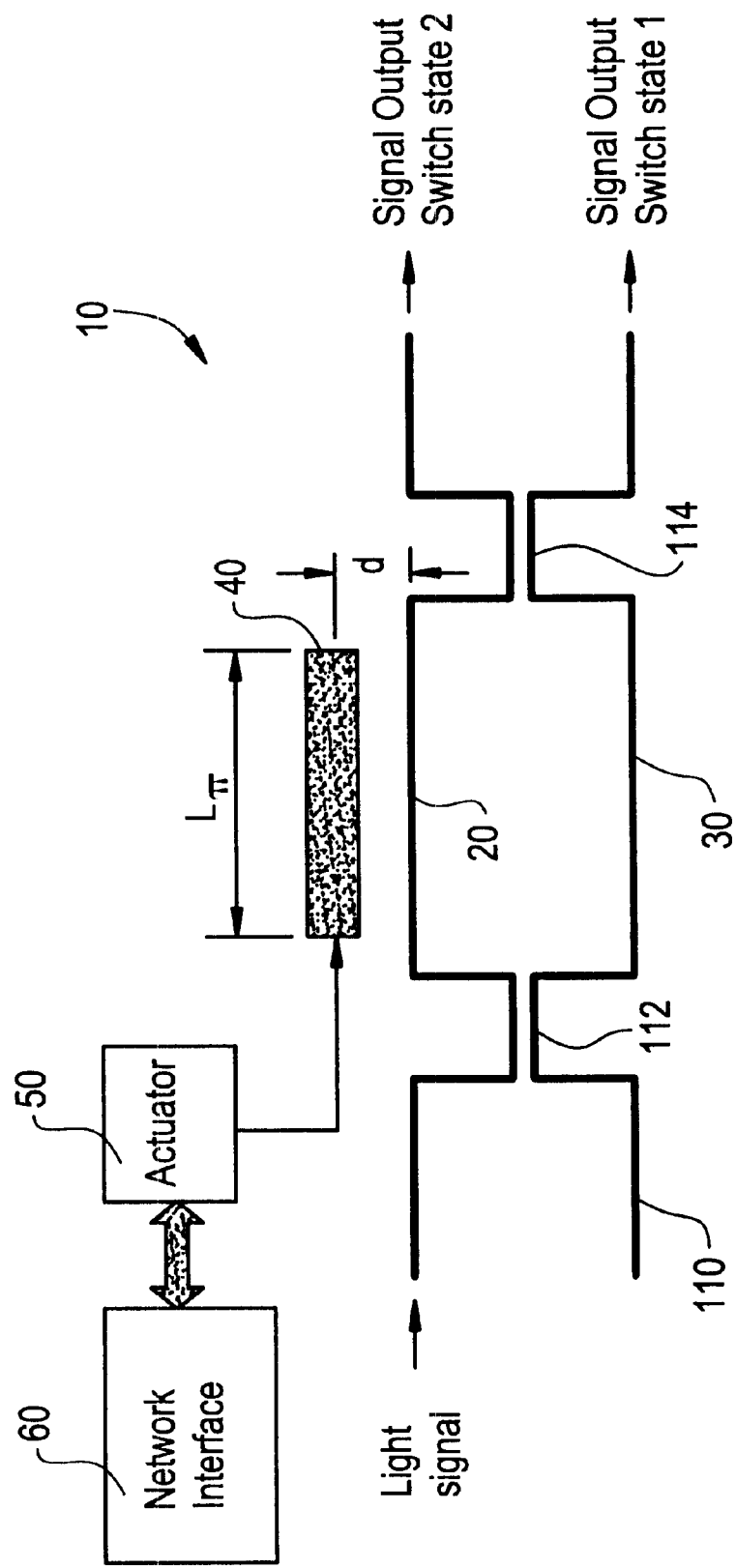
FIG. 4 is a chart showing the relationship between birefringence and the extinction ratio for the present invention.

As embodied herein, and depicted in FIG. 4, a schematic of piezoelectric optical switch 10 according to a second embodiment of the present invention includes a planar Mach-Zehnder 100 formed by waveguide 20 and waveguide 30. A piezoelectric rib 40 is disposed on waveguide structure 20 an offset distance "d" away from the waveguide core 22 (see FIG. 2). Piezoelectric rib 40 has a length equaling $L_\pi$. Piezoelectric rib 40 is electrically connected to actuator 50. Actuator 50 is connected to network interface 60, which receives network commands and drives actuator 50 accordingly.

The operation of optical device 10 according to the second embodiment of the present invention as depicted in FIG. 4, is as follows. In a first actuation state, the network interface receives a command to direct the light signal to the output of waveguide 30. Network interface 60 drives actuator 50 and piezoelectric rib 40 is deenergized. A light signal is directed into Mach-Zehnder 100 as shown. Half of the light signal is coupled into waveguide 30 by 3 dB coupler 112. As one ordinary skill in the art will appreciate, a symmetric Mach-Zehnder with perfect 3 dB couplers operates in a cross state when no phase difference exits between waveguides 20 and 30 and the light signal will exit device 10 from the output of waveguide 30.

In a second state, the network interface receives a command directing the light signal to exit optical device 10 from the output of waveguide 20. In response, network interface 60 drives actuator 50 to supply piezoelectric rib 40 with the voltage necessary for inducing a $\pi$ radian phase difference. Piezoelectric rib 40 expands and deforms waveguide structure 20 inducing a strain in waveguide 20. The induced strain caused by the deformation will cause the refractive index and the length of waveguide 20 to change. Both of these factors contribute to a change in the optical path length that the light signal follows when propagating in waveguide 20. One ordinary skill in the art will appreciate that the amount of voltage required depends on the amount of strain required to produce an index variation that will generate the desired phase difference. The phase difference determines the size of the electric field required to drive piezoelectric element 40. The voltage supplied to piezoelectric rib 40 establishes a $\pi$ radian phase difference between waveguide 20 and waveguide 30. As a result optical device 10 is switched and the light signal exits device 10 from waveguide 20.

Figure 5:
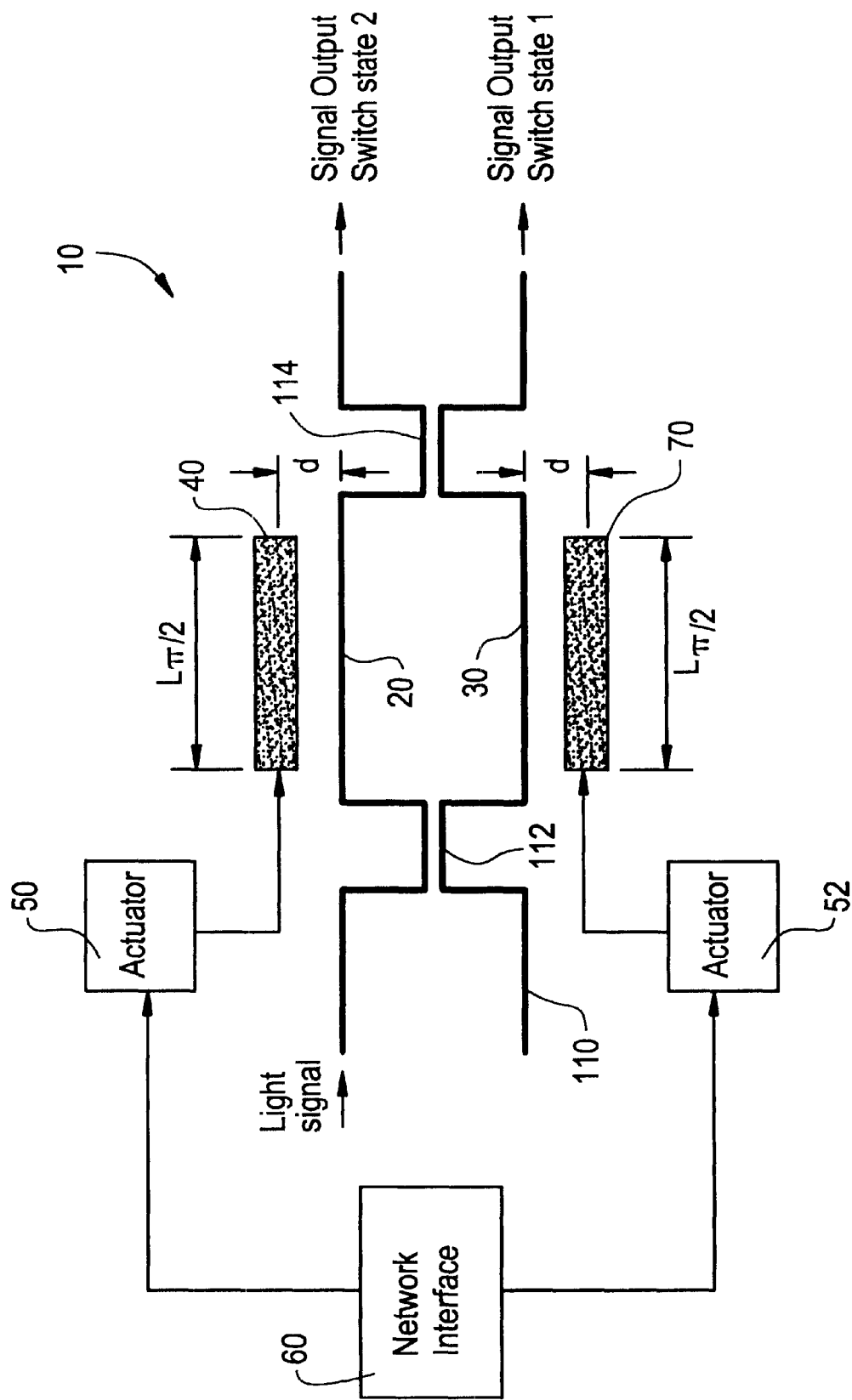
FIG. 5 is a schematic of a piezoelectric optical switch according to an alternate embodiment of the present invention.

In a third embodiment of the invention, as embodied herein and as shown in FIG. 5, a schematic of piezoelectric Mach-Zehnder optical switch 10 includes a planar Mach-Zehnder 100 formed by waveguide 20 and waveguide 30. A piezoelectric rib 40 is disposed on waveguide structure 20 offset a distance "d" away from the waveguide 20. Another piezoelectric rib 70 is disposed on waveguide structure 30 also offset a distance "d." Piezoelectric ribs 40 and 70 could also be disposed on the interior sides of waveguides 20 and 30, respectively. Note that FIG. 2 and the discussion of offset distance "d" applies to this embodiment as well as the first embodiment. Piezoelectric rib 40 is electrically connected to actuator 50 and piezoelectric rib 70 is electrically connected to actuator 52. Actuators 50 and 52 are driven in tandem by network interface 60.

It will be apparent to those of ordinary skill in the pertinent art that modifications and variations can be made to piezoelectric ribs 40 and 70 depending on the amount of phase shift each rib is required to provide. In the second embodiment of the present invention, the switching functionality is distributed between waveguides 20 and 30 by placing a second piezoelectric rib 70 on waveguide 30. As in the first embodiment, a total phase difference of $\pi$ radians between waveguides 20 and waveguide 30 must be provided to switch the light signal into the output of waveguide 20. However, using piezoelectric rib 70 enables the use of a "push-pull" effect wherein piezoelectric rib 40 provides a positive phase shift and piezoelectric rib 70 provides a negative phase shift. Thus, piezoelectric rib 40 must provide a $+\pi/2$ radian phase shift and piezoelectric rib 70 must provide a $-\pi/2$ radian phase shift. Since the phase shift each piezoelectric rib is required to provide has been reduced from $\pi$ radians to $\pi/2$ radians, the length of each rib can also be reduced by approximately a factor of two:

$$L\frac{\pi}{2} = \frac{\alpha\lambda}{K_x + K_y} \quad (10)$$

where $\alpha \cong 0.5$. To avoid problems associated with mechanical cross-talk, piezoelectric ribs 40 and 70 should be separated by a minimum distance of 500 $\mu$m. The recommended separation range is between 500 $\mu$m and 1000 $\mu$m. This is a trade off between the size of the device and cross-talk.

Figure 6:
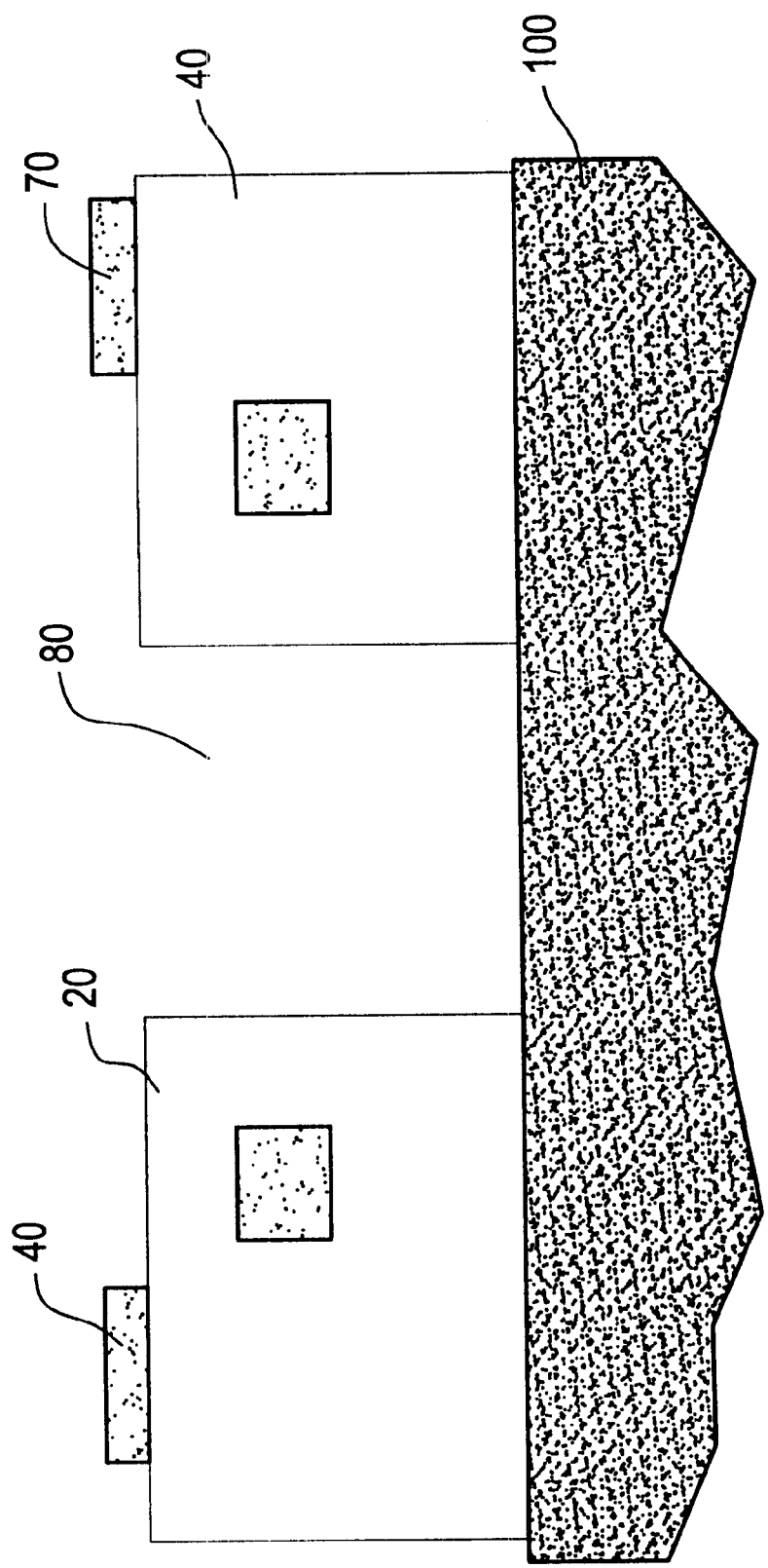
FIG. 6 is a detail view of an etched groove used to mechanically isolate the arms of a Mach-Zehnder to reduce cross-talk.

As embodied herein, and depicted in FIG. 6, an alternate embodiment of the present invention may include an etched groove 80 between waveguide 20 and waveguide 30. The etched groove 80 is provided to reduce the mechanical cross-talk by isolating arms 20 and 30 of the Mach-Zehnder 100.

The operating principles of the present invention that establish the width, thickness, power requirements, and positioning of piezoelectric ribs 40 and 70 with respect to the strain and phase shift induced in waveguides 20 and 30 are essentially identical to those discussed above with respect to the first embodiment depicted in FIGS. 1 and 2.

The operation of optical device 10 according to the third embodiment of the present invention as depicted in FIG. 5 is as follows. In a first actuation state, the needs of the network require that the light signal directed into the output of waveguide 30. Half of the light signal entering Mach-Zehnder 100 is coupled into waveguide 30 by 3 dB coupler 112. A symmetric Mach-Zehnder with perfect 3 dB couplers 112 and 114 will operate in a cross state when no phase difference exits between waveguides 20 and 30 and the light signal will the output of waveguide 30. Thus, upon processing the network command, network interface 60 drives actuators 50 and 52 and the voltage supplied to piezoelectric ribs 40 and 70 drops to approximately zero volts. As discussed above and as one of ordinary skill in the art will appreciate, Mach-Zehnders with perfect 3 dB couplers do not exist in practice. At each switch state, actuators 50 and 52 supply piezoelectric ribs 40 and 70, respectively, with the nominal voltages plus small bias voltages to compensate for the small phase variations generated by the imperfections of the Mach-Zehnder.

In a second actuation state, the network interface is commanded to direct the light signal into the output of waveguide 20. Network interface 60 drives actuators 50 and 52 accordingly. Actuator 50 supplies a positive voltage to piezoelectric rib 40 and actuator 52 supplies a negative voltage of approximately the same magnitude to piezoelectric rib 70. Piezoelectric rib 40 will expand when deforming waveguide structure 20. Piezoelectric rib 70 will contract when deforming waveguide structure 30. The deformations strain waveguides 20 and 30 and thereby change their path lengths. The path length variation in waveguide 20 results in approximately a $+\pi/2$ radian phase shift whereas the path length variation in waveguide 30 yields approximately a $-\pi/2$ radian phase shift. Thus, a $\pi$ radian phase difference, or an odd multiple of $\pi$ radions, between waveguide 20 and waveguide 30 is established and the light signal is directed into the output of waveguide 20. Of course the polarities of the voltages could be reversed to yield the same results. However, the voltages must have opposite polarities.

Figure 7:
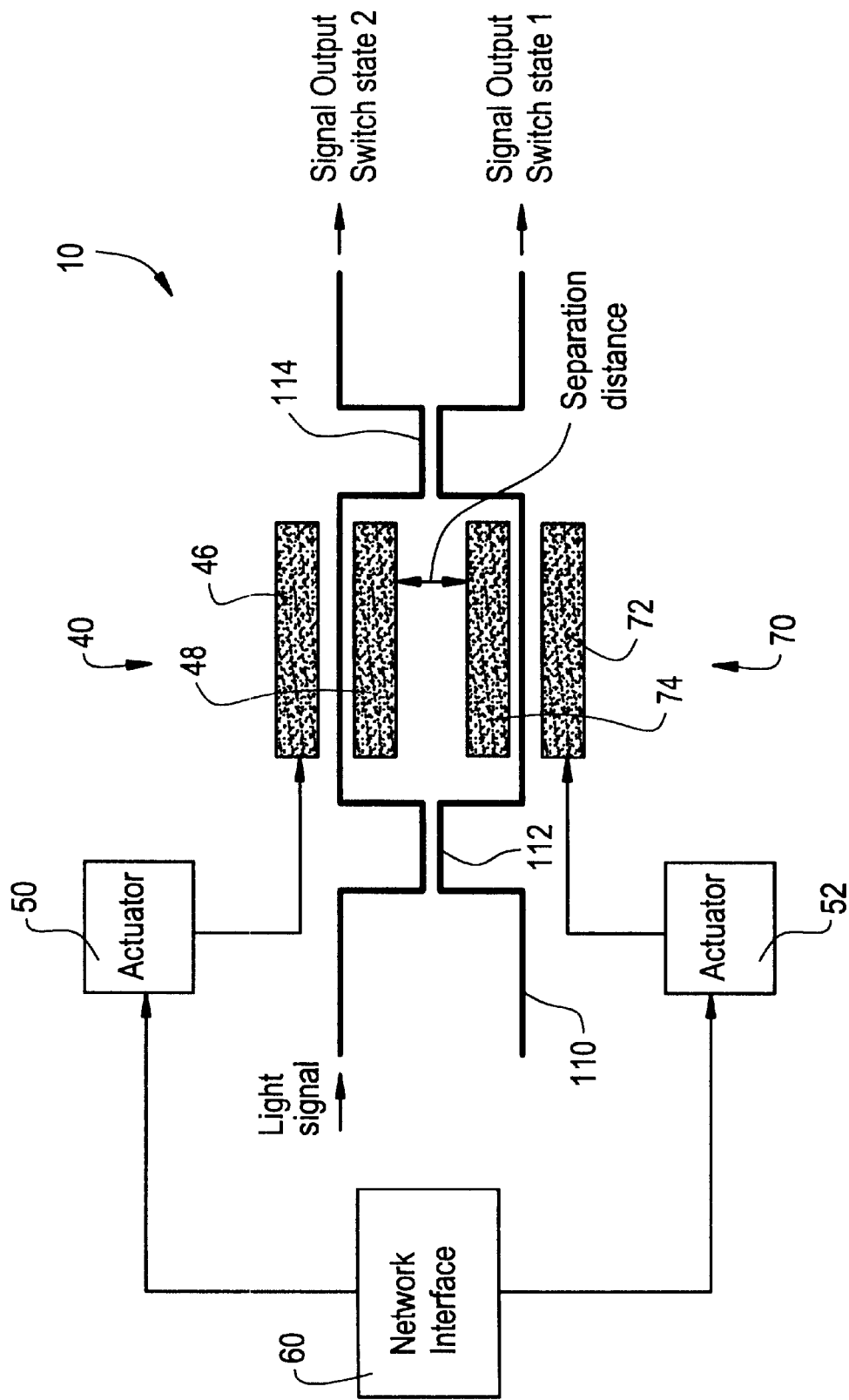
FIG. 7 is a schematic of a piezoelectric optical switch according to another alternate embodiment of the present invention.

In another alternative embodiment of the present invention, as embodied herein and as shown in FIG. 7, piezoelectric rib 40 consists of an outer piezoelectric strip 46 disposed on an exterior side of waveguide 20, and inner piezoelectric strip 48 disposed on an interior side of waveguide 20. Piezoelectric rib 70 consists of outer piezoelectric strip 72 disposed on an exterior side of waveguide 30, and inner piezoelectric strip 74 disposed on an interior side of waveguide 30. Inner piezoelectric strip 48 and inner piezoelectric strip 74 are separated by a minimum of 500 $\mu$m, the distance being within the recommended separation range between 500 $\mu$m and 1000 $\mu$m, as discussed above and shown in FIG. 7. This is a trade off between cross-talk and device size. The etched groove shown in FIG. 6 could also be used in this embodiment. Actuator 50 is connected to piezoelectric strips 46 and 48, supplying them with identical voltages. Actuator 52 is connected to piezoelectric strips 72 and 74, supplying them with identical voltages. Network interface 60 is connected to actuator 50 and actuator 52, and it drives then in tandem.

It will be apparent to those of ordinary skill in the pertinent art that modifications and variations can be made to piezoelectric ribs 40 and 70 of the present invention depending on the amount of phase shift each is required to provide. By placing piezoelectric strips 46, 48, 72 and 74 on both sides of their respective waveguides 20 and 30, the length of the piezoelectric ribs can be reduced by a factor of two with respect to the second embodiment and a factor of four with respect to the first embodiment. Thus, in equation (10), $\alpha \cong 0.25$.

With the exception of the variations discussed above, optical switch 10 in FIG. 7 operates in the same way as the embodiment depicted in FIG. 5 and thus, a description of its operation will not be repeated.

Figure 8:
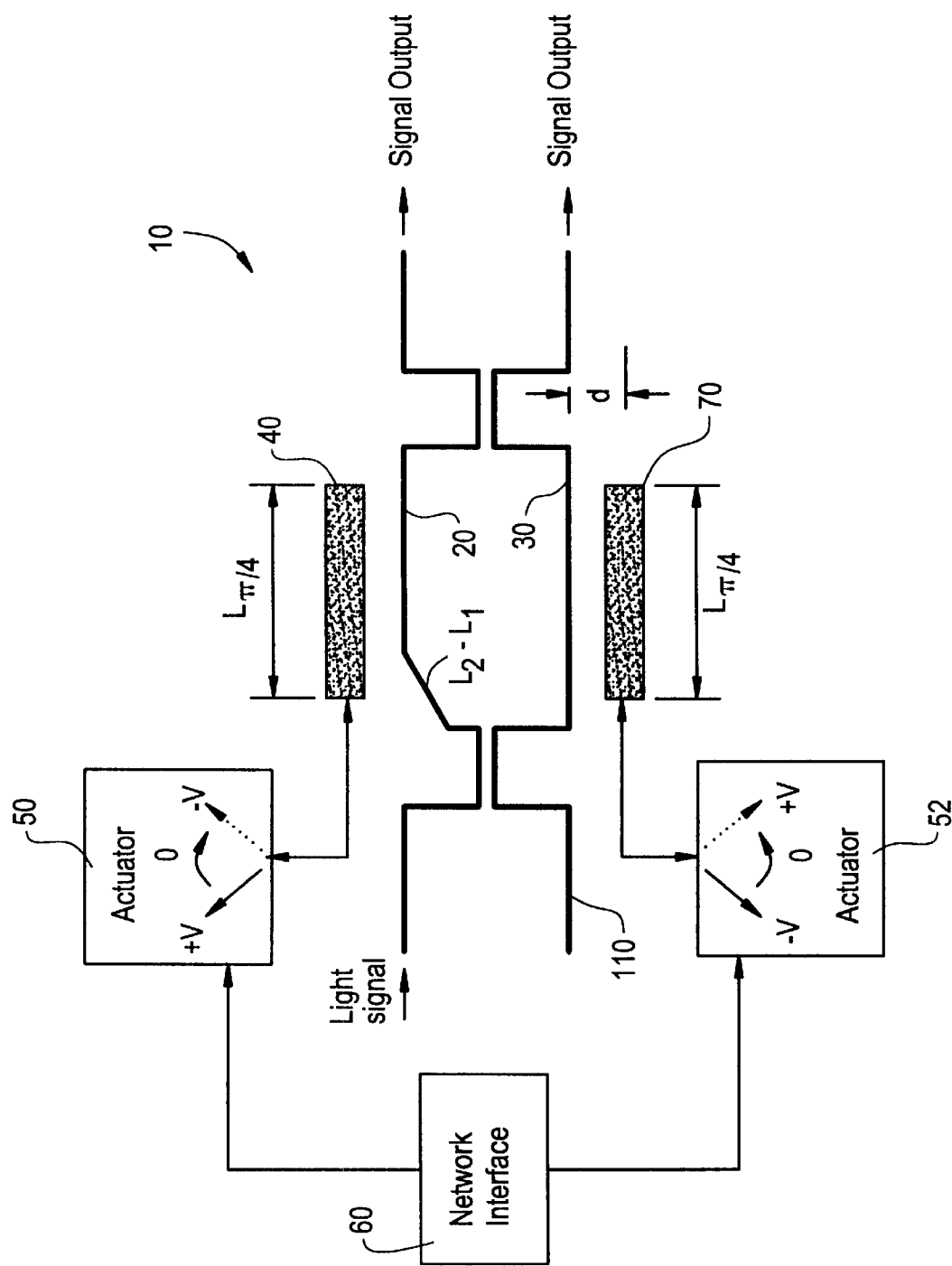
FIG. 8 is a schematic of a piezoelectric optical switch according to another alternate embodiment of the present invention.

In yet another alternative embodiment, as embodied herein and as shown in FIG. 8, a schematic of piezoelectric optical switch 10 includes Mach-Zehnder 100 formed by waveguide 20 and waveguide 30. Piezoelectric rib 40 is disposed on waveguide structure 20 with an offset distance from the waveguide core 22. Another piezoelectric rib 70 is disposed on waveguide structure 30 also disposed an offset distance from the core. The discussion of offset distance with respect to FIG. 2 applies to this embodiment, as well. Piezoelectric rib 40 is electrically connected to actuator 50.

Piezoelectric rib 70 is electrically connected to actuator 52. Actuators 50 and 52 are connected to, and driven in tandem by, network interface 60.

Actuator 50 and actuator 52 may be of any suitable well-known type, but there is shown by way of example, a voltage source capable of supplying three discrete voltages to piezoelectric rib 40 and piezoelectric rib 70. This embodiment uses a "push-pull" effect similar to the technique discussed above with respect to an earlier embodiment. Commutation is effected by driving piezoelectric rib 40 and piezoelectric rib 70 with voltages having opposite polarities. Thus, the voltage sources operate in tandem such that actuator 52 supplies −V volts when actuator 50 supplies +V volts. When actuator 50 supplies −V volts, actuator 52 is supplying +V volts. When actuator 50 is at approximately ground, so is actuator 52. As discussed above, the nominal voltage V, is dependent on a variety of factors, such as the desired phase difference and size of the piezoelectric rib. It will be apparent to one of ordinary skill in the pertinent art, that multiple voltage combinations may be used to split the light signal between waveguides 20 and 30 as desired.

It will be apparent to those of ordinary skill in the pertinent art that modifications and variations can be made to the present invention depending on the amount of phase shift each rib is required to provide. In FIG. 8, waveguide 20 is shorter than waveguide 30 by a distance $\Delta L = L_2 - L_1$, which is approximately $250 \mu m$ when $\lambda = 1.55 \mu m$ and $n \approx 1.5$. This path length difference between waveguide 20 and waveguide 30 establishes a $\pi/2$ radian phase difference between waveguide 20 and waveguide 30. Thus, in order to obtain either $\pi$ radian phase shift or zero phase shift between waveguides 20 and 30, each of piezoelectric elements 40 and 70 are only required to produce a $\pi/4$ radian phase shift. Because the phase shift piezoelectric rib 40 and piezoelectric rib 70 must provide has been reduced from $\pi$ radians to $\pi/4$ radians, the length can also be reduced by approximately a factor of four. Thus, equation (10) can be used to calculate the lengths $L_{(\pi/4)}$, of piezoelectric rib 40 and piezoelectric rib 70, where $\alpha \approx 0.25$. One of ordinary skill in the art will also recognize that this embodiment can be implemented using one piezoelectric rib or four piezoelectric ribs.

It will be apparent to those of ordinary skill in the pertinent art that modifications and variations can be made to the present invention depicted in FIG. 8. Instead of designing the path length difference to provide a $\pi/2$ radian phase difference, the path length difference can be designed to provide a permanent $\pi$ radian phase difference. In this case, when the piezoelectric ribs are not actuated, optical device 10 is in the bar state rather than in a cross-state. This design is of interest when it is more probable that the switch will be used in the bar state rather than the cross-state.

As discussed above with respect to an earlier embodiment, to avoid problems associated with mechanical cross-talk, piezoelectric ribs 40 and 70 should be separated by a minimum distance of 500 $\mu$m. The recommended separation range is between 500 $\mu$m and 1000 $\mu$m. As discussed above, the separation range is a trade-off between cross-talk and device-size. The etched groove shown in FIG. 6 can also be used in this embodiment.

The operation of optical device 10 according to the invention as depicted in FIG. 8 is as follows. In a first actuation state, the network commands optical device 10 to direct the light signal into the output of waveguide 20. Network interface 60 drives actuators 50 and 52 accordingly. Actuator 50 supplies a positive predetermined voltage to piezoelectric rib 40. Actuator 52 applies a negative voltage of the same magnitude to piezoelectric rib 70. Piezoelectric rib 40 deforms waveguide 20 and approximately a $\pi/4$ radians phase shift is generated. Piezoelectric rib 70 deforms waveguide 30 and approximately a $-\pi/4$ radians phase shift is generated. As one of ordinary skill in the art will recognize, the actual phase shifts are dependent upon the inherent imperfections in the MZ1. The phase variation may be slightly different on each one. The requirement is that a total phase difference of $\pi$ radians is established between waveguide 20 and waveguide 30. Upon doing so, optical device 10 is commutated and the light signal exits the device from the output of waveguide 20.

In a second actuation state shown in FIG. 8, actuator 50 and 52 supply approximately zero volts to their respective piezoelectric ribs, 40 and 70. As discussed above, the asymmetric Mach-Zehnder in FIG. 8 is fabricated having an inherent phase difference of approximately $\pi/2$ radians between waveguide 20 and waveguide 30. Thus, when piezoelectric ribs 40 and 70 are not deforming waveguides 20 and 30, respectively, the inherent $\pi/2$ radian phase difference causes the light signal to be equally split between the outputs of waveguides 20 and 30. In this state, the optical device 10 is a 3 dB splitter.

In a third actuation state, the network interface 60 is commanded to direct the light signal into the output of waveguide 30. Network interface 60 drives actuator 50 to supply piezoelectric rib 40 with a negative voltage. In similar manner, actuator 52 supplies piezoelectric rib 70 with a positive voltage of approximately the same magnitude. Piezoelectric rib 40 deforms waveguide 20 and generates approximately a $-\pi/4$ radian phase shift. Piezoelectric rib 70 deforms waveguide 30 and approximately a $+\pi/4$ radians phase shift is generated. In this actuation state, the phase shifts generated by piezoelectric ribs 40 and 70 cancel the inherent $\pi/2$ phase difference between waveguide 20 and waveguide 30 caused by their path length difference. Thus, no phase difference exists between waveguide 20 and waveguide 30 and the light signal is directed into the output of waveguide 30 as commanded.

Figure 9:
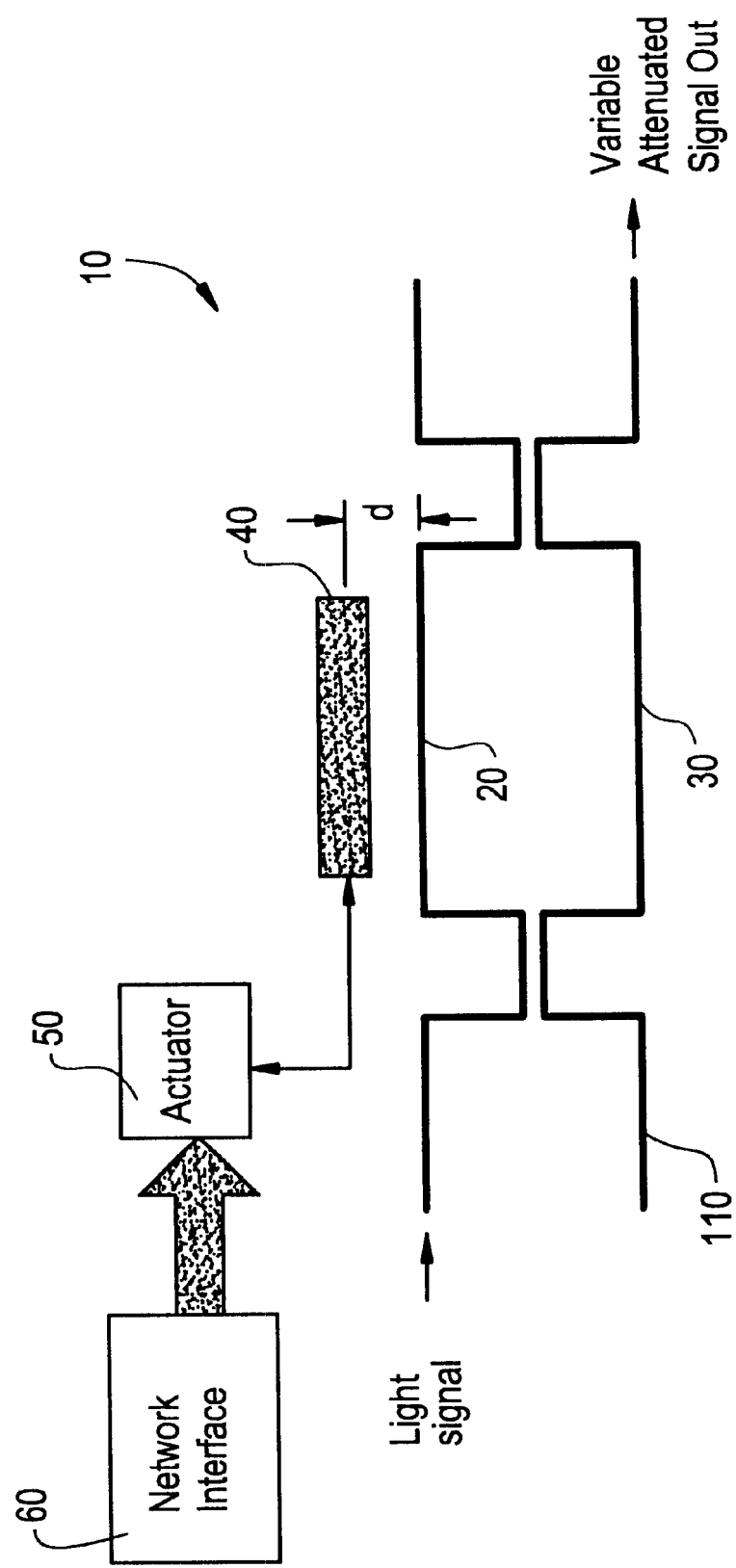
FIG. 9 is a schematic of a piezoelectric optical device featuring a variable attenuation controller according to yet another alternate embodiment of the present invention.

In yet another alternative embodiment, as embodied herein and as shown in FIG. 9, a schematic of piezoelectric variable attenuator 10 includes a Mach-Zehnder 100 formed by waveguide 20 and waveguide 30. Piezoelectric rib 40 is disposed on waveguide structure 20 an offset distance from the waveguide core 22. The discussion of the offset distance with respect to FIG. 2 equally applies to this embodiment, as well. Piezoelectric rib 40 is electrically connected to actuator 50.

Actuator 50 may be of any suitable well known type, but there is shown by way of example, a variable voltage source for dynamically varying the voltage over a continuous range of voltages. One of ordinary skill in the art will appreciate that the power level of the light signal in the output of either waveguide 20 or 30 is dynamically controlled in proportion to voltage level supplied by actuator 50. Thus, variable attenuator 10 is implemented by varying the voltage over a continuous range.

The operation of variable attenuator 10 according to the invention as depicted in FIG. 9 is as follows. As discussed with respect to the first embodiment, if piezoelectric rib 40 is de-energized, the light signal propagating in a symmetric Mach-Zehnder 100 will be directed into the output of waveguide 30. When a command is received ordering that the light output from waveguide 30 be attenuated to a certain level, network interface 60 interprets the command and translates it into a voltage level within the range provided by actuator 50. Actuator 50 supplies piezoelectric rib 40 with the voltage level as ordered. In response, piezoelectric rib 40 expands and deforms waveguide structure 20, causing the refractive index and the length of waveguide 20 to change. Thus, a portion of the light signal is diverted from the output of waveguide 30 and redirected into the output of waveguide 20. As the voltage is increased more of the signal is diverted from waveguide 30 and is thereby attenuated. When actuator 50 supplies the predetermined voltage to piezoelectric rib 40 a π radian phase difference between waveguide 20 and waveguide 30 is established. In this state, the output from waveguide 30 is completely attenuated. Thus, the voltage supplied by actuator 50 is proportional to the attenuation amount.

Figure 10:
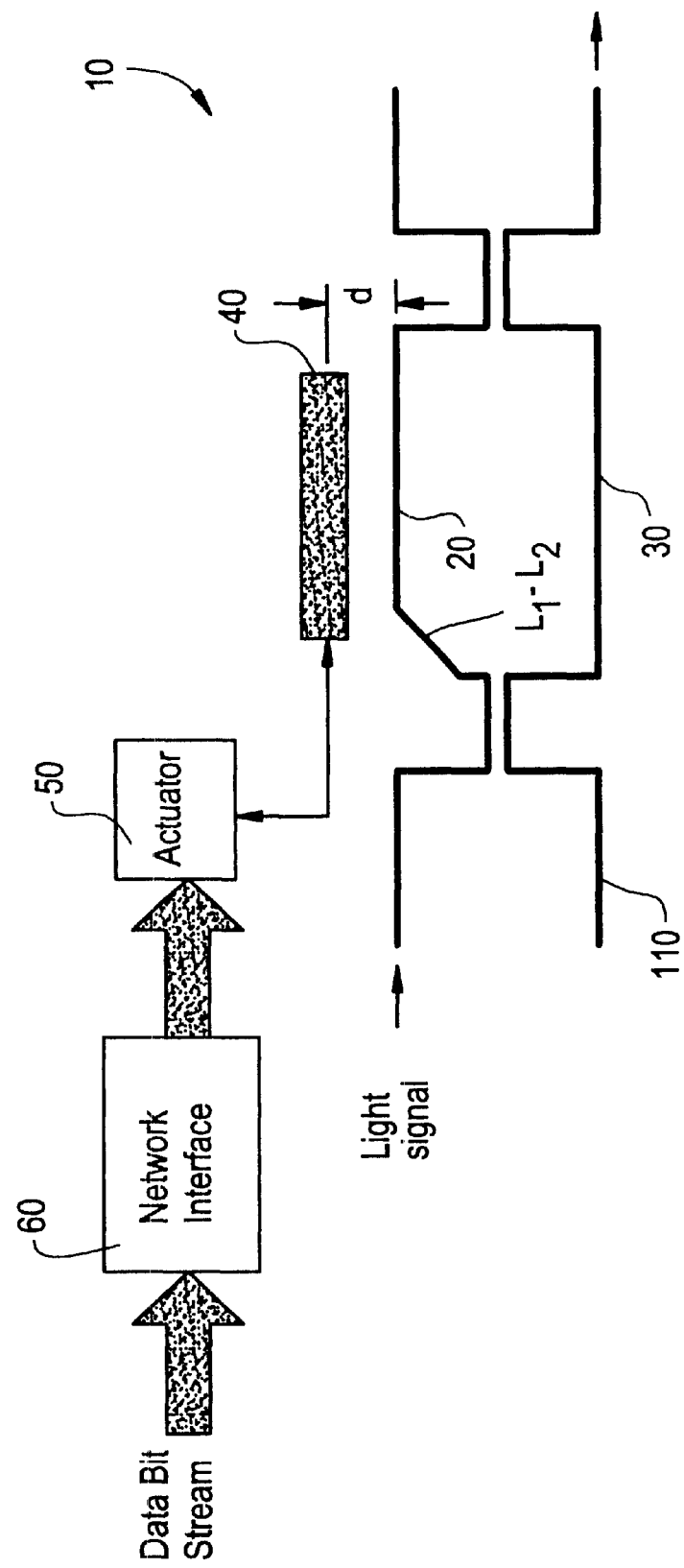
FIG. 10 is a schematic of a piezoelectric optical device featuring an optical modulator according to yet another alternate embodiment of the present invention.

In yet another alternative embodiment, as embodied herein and as shown in FIG. 10, a schematic of piezoelectric tunable filter 10 includes a Mach-Zehnder 100 formed by waveguide 20 and waveguide 30. Note that waveguide 20 is shorter than waveguide 30 by a distance $\Delta L = L_2 - L_1$, which is approximately 200 μm. Piezoelectric rib 40 is disposed on waveguide structure 20 an offset distance from the waveguide core 22. The discussion of the offset distance with respect to FIG. 2 equally applies to this embodiment, as well. Piezoelectric rib 40 is electrically connected to actuator 50.

The operation of tunable filter 10 according to the invention as depicted in FIG. 10 is as follows. The phase variation between the two arms is given by the following equation:

$$\Delta \Phi = \frac{2\pi}{\lambda} n \Delta L \quad (11)$$

Since the refractive index n is wavelength dependent, the product nΔL is also wavelength dependent. For a large ΔL, a large phase difference may be obtained between different wavelengths. For example, in a first actuation state wherein piezoelectric rib 40 is not actuated, there is no phase difference for light at $\lambda_1 = 1554.5$ nm and a π phase difference exists for light at $\lambda_2 = 1558.5$ nm. Thus, $\lambda_1$ won't be interferred with, whereas $\lambda_2$ will experience destructive interference. In a second actuation state, piezoelectric rib 40 induces a π phase difference between waveguide 20 and waveguide 30. Because of the wavelength dependency discussed above, the attenuation at the different wavelengths will change and $\lambda_2$ won't be interferred with and $\lambda_1$ will be destroyed by destructive interference.

Figure 11A:
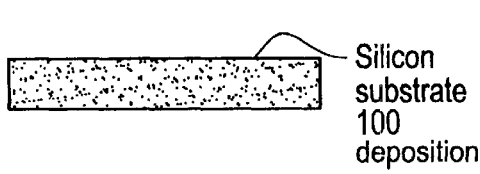
FIGS. 11A–Q are sequential diagrammatic views of the piezoelectric optical switch of the present invention in successive stages of fabrication.
Figure 11B:
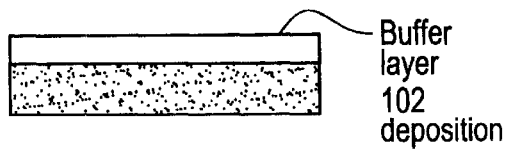
Figure 11C:
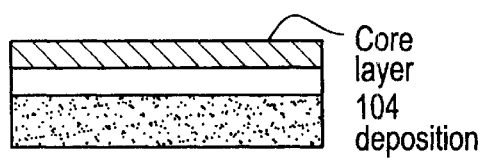
Figure 11D:
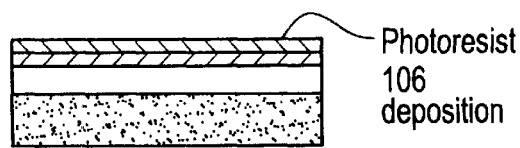
Figure 11E:
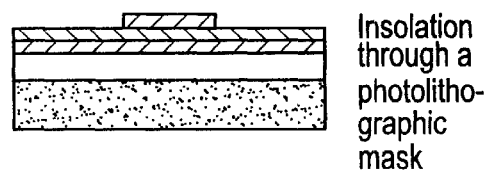
Figure 11F:
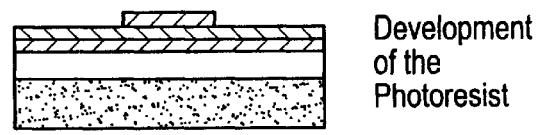
Figure 11G:
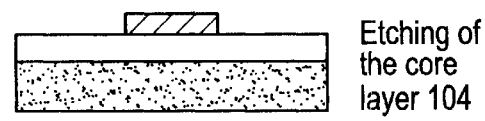
Figure 11H:
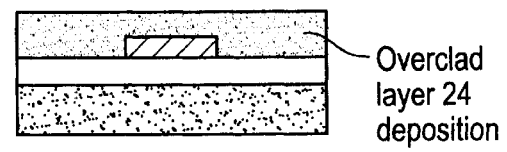
Figure 11:
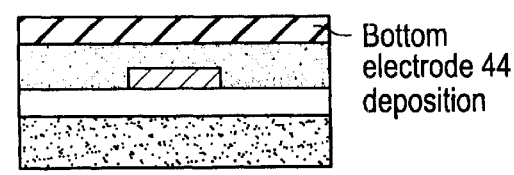
Figure 11J:
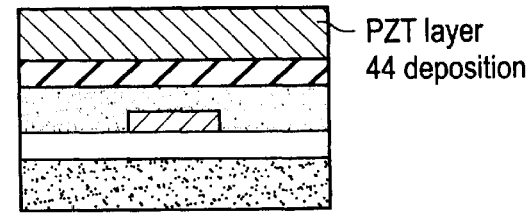
Figure 11K:
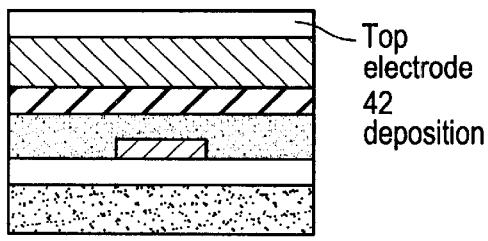
Figure 11L:
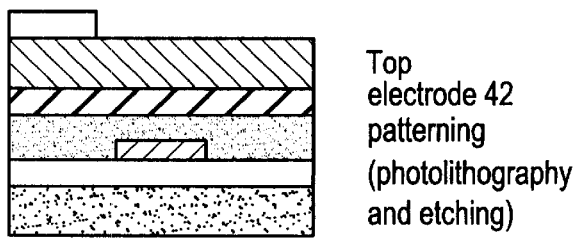
Figure 11M:
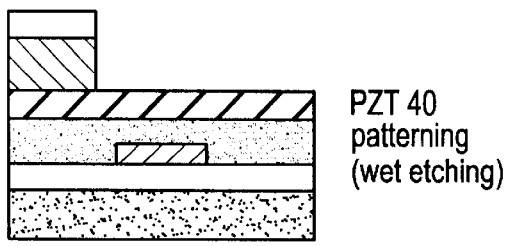
Figure 11N:
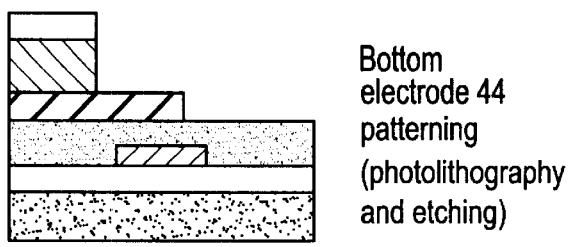
Figure 11O:
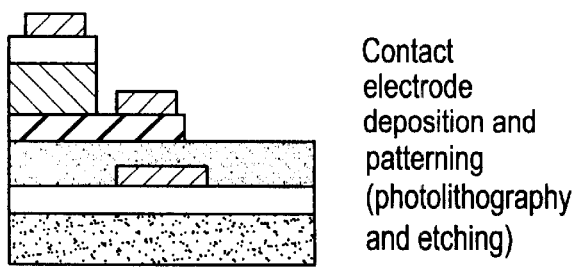
Figure 11P:
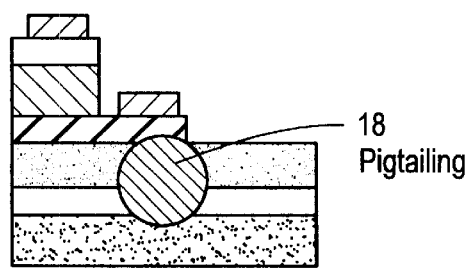
Figure 11Q:
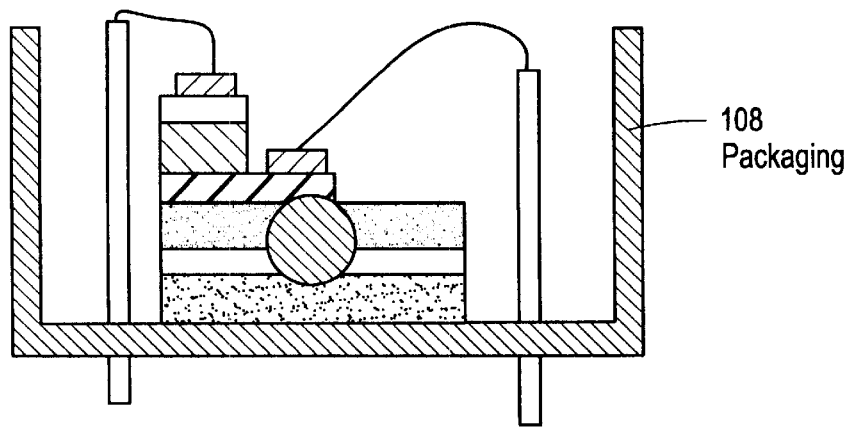

FIGS. 11A–Q are sequential diagrammatic views of the piezoelectric optical switch of the present invention in successive stages of fabrication. In FIG. 11A substrate 100 is formed. Substrate 100 may be of any suitable well known type, but there is shown by way of example a substrate formed of silicon glass. FIG. 11B shows buffer layer 112 being deposited on substrate 100. Buffer layer 112 may be of any suitable well known type, but there is shown by way of example a layer formed of silica glass. FIG. 11C shows core layer 114 being deposited on buffer layer 112. Core layer 114 may be of any suitable well known type, but there is shown by way of example a layer formed of silica glass having a refractive index n, higher than that of the buffer layer 112. One of ordinary skill in the pertinent art will appreciate that the fabrication steps described in FIGS. 11A–11C can also be realized using polymers, copolymers, monomers or other suitable materials. FIGS. 11D and 11H show the photolithographic process of forming waveguide structure 20 and waveguide structure 30. Mask 116 is positioned over core layer 114 and the pattern of waveguide structures 20 and 30 are transferred to the core layer 114 by illumination of the mask. The etching process shown in FIG. 11G removes excess core material. In FIG. 11H overclad layer 24 is deposited over waveguide structures 20 and 30. FIGS. 11I–11N show piezoelectric rib 40 being formed on waveguide structure 20. A layer of PZT or ZnO is deposited on bottom electrode 44. The dimensions of the PZT rib will vary within the ranges provided in the discussion above. In FIG. 11P pigtails 18 are connected to waveguides 20 and 30 to provide optical connectivity. Finally, in FIG. 11Q, the piezoelectric rib electrodes are wired to a connector disposed in the packaging optical unit 118.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical device for selectively directing a light signal into a first output or a second output, said optical device comprising:
   at least one waveguide having at least one core connected to the first output, the light signal propagating along said at least one waveguide in a direction of propagation; and
   at least one piezoelectric element for switching the light signal from the first output into the second output by inducing a plurality of mutually orthogonal strain components in said at least one waveguide, said at least one piezoelectric element being disposed on said at least one waveguide in a predetermined position such that only a first component of said plurality of mutually orthogonal strain components substantially exists in said at least one core, wherein said first component is a strain component aligned to said direction of propagation.

2. The optical device according to claim 1, wherein the predetermined position causes a birefringence value in the at least one core to be substantially negligible.

3. The optical device according to claim 1, wherein the at least one waveguide comprises a first waveguide and a second waveguide to thereby form an optical coupler.

4. The optical device according to claim 1, wherein the at least one waveguide comprises a first waveguide and a second waveguide to thereby form a Mach-Zehnder device.

5. A Mach-Zehnder optical device for directing a light signal having a wavelength λ into a first output or a second output, said optical device comprising:
   a first waveguide having a first core connected to the first output, a refractive index n, a first length $L_1$, and a first output, the light signal propagating in said first core in a direction of propagation; and
   a first piezoelectric rib for switching the light signal between the first output and the second output by creating a first plurality of mutually orthogonal strain components in said first waveguide, said first piezoelectric rib is disposed on said first waveguide at a first predetermined offset distance from said first core such that only a first component of said first plurality of mutually orthogonal strain components substantially exists in said first core, wherein said first component is parallel to said direction of propagation.

6. The optical device according to claim 5, wherein the first predetermined position causes a birefringence value in the first core to be substantially negligible.

7. The optical device according to claim 5, further comprising:
   a second waveguide disposed adjacent to the first waveguide having a second core connected to the second output, the refractive index n, and a second length $L_2$, wherein said second core propagates the light signal in the direction of propagation; and a first actuator connected to the first piezoelectric rib for causing the first piezoelectric rib to produce a first waveguide deformation, said first waveguide deformation produces the first plurality of mutually orthogonal strain components in the first waveguide.

8. The optical device according to claim 7, wherein the first waveguide deformation induces a phase difference between the first waveguide and the second waveguide, said phase difference being characterized by the equation:

$$\Delta\Phi = \frac{2\pi L_1}{\lambda}\left[n\frac{dL_1}{L_1} + dn\right]$$

where dn is a change in the refractive index n and $dL_1$ is a change in the length $L_1$.

9. The optical device according to claim 5, wherein the light signal comprises a first polarized component in an x-direction and a second polarized component in a y-direction, wherein said x-direction, said y-direction and a z-direction are mutually orthogonal axes of a rectangular coordinate system, and said z-direction is in the direction of propagation.

10. The optical device according to claim 9, wherein the first plurality of mutually orthogonal strain components are related to a change in the refractive index n, by equations:

$$dn_x = -\frac{n^3}{2}(p_{11}\varepsilon_x + p_{12}\varepsilon_y + p_{12}\varepsilon_z), \text{ and}$$

$$dn_y = -\frac{n^3}{2}(p_{12}\varepsilon_x + p_{11}\varepsilon_y + p_{12}\varepsilon_z)$$

wherein $dn_x$ is a change in a refractive index for the first polarized component, $dn_y$ is a change in a refractive index for the second polarized component, $p_{11}$ and $p_{12}$ are photo-elastic coefficients, and $\varepsilon_x$, $\varepsilon_y$, and $\varepsilon_z = dL_1/L_1$, are the first plurality of mutually orthogonal strain components and $dL_1$ is a change in the first length $L_1$.

11. The optical device according to claim 10, wherein the first waveguide deformation establishes a first polarized component phase shift $\Delta\Phi_x$, and a second polarized component phase shift $\Delta\Phi_y$, between the first waveguide and the second waveguide according to equations:

$$\Delta\Phi_x = \frac{2\pi L_1}{\lambda}K_x \text{ and,}$$

$$\Delta\Phi_y = \frac{2\pi L_1}{\lambda}K_y,$$

wherein $K_x$ and $K_y$ are non-dimensional coefficients and functions of the first plurality of mutually orthogonal strain components.

12. The optical device according to claim 10, wherein a first birefringence value in the first core is related to the plurality of mutually orthogonal strain components by an expression:

$$Q = \frac{dn_x + dn_y}{dn_x - dn_y}$$

wherein Q is inversely proportional to said first birefringence value.

13. The optical device according to claim 12, wherein the first predetermined offset distance is approximately equal to $\lambda/4n$.

14. The optical device according to claim 12, wherein the first output and second output have an extinction ratio that is at least 20 dB when Q is greater than 16.

15. The optical device according to claim 5, wherein the first waveguide deformation establishes a phase difference of $\pi$ radians between the first waveguide and the second waveguide causing the light signal to be directed into the first output.

16. The optical device according to claim 15, wherein the light signal is directed into the second output when there is no first waveguide deformation.

17. The optical device according to claim 15, wherein the first actuator is a voltage source connected to the first piezoelectric rib for supplying a predetermined voltage to the first piezoelectric rib.

18. The optical device according to claim 15, wherein the first piezoelectric rib has a first rib length $L_\pi$, that corresponds to a $\pi$ radian phase shift in accordance with the equation:

$$L_\pi = \frac{\lambda}{K_x + K_y}$$

wherein $K_x$ and $K_y$ are non-dimensional coefficients and a function of the first plurality of mutually orthogonal strain components.

19. The optical device according to claim 18, wherein $L_\pi$ is approximately in the range of 2 mm to 3 cm.

20. The optical device according to claim 18, wherein a width of the first piezoelectric rib is approximately in the range of 20 $\mu$m to 300 $\mu$m.

21. The optical device according to claim 18, wherein a thickness of the first piezoelectric rib is approximately in the range of 3 $\mu$m to 300 $\mu$m.

22. The optical device according to claim 5, further comprising:

a second piezoelectric rib for switching the light signal between the first output and the second output in concert with the first piezoelectric rib by creating a second plurality of mutually orthogonal strain components in the second waveguide, said second piezoelectric rib is disposed on the second waveguide at a second predetermined distance offset from the second core such that only a second component of said second plurality of mutually orthogonal strain components substantially exists in the second core where said second component is parallel to the direction propagation; and a second actuator connected to the second piezoelectric rib for causing the second piezoelectric rib to generate a second waveguide deformation, said second waveguide deformation produces the second plurality of mutually orthogonal strain components in the second waveguide.

23. The optical device according to claim 22, wherein the first length $L_1$ is substantially equal to the second length $L_2$.

24. The optical device according to claim 23, wherein the first waveguide deformation is caused by supplying the first actuator with a first predetermined voltage and the second waveguide deformation is caused by supplying the second actuator with a second predetermined voltage having an opposite polarity to that of said first predetermined voltage.

25. The optical device according to claim 24, wherein the first waveguide deformation establishes a first phase shift in the first waveguide and the second waveguide deformation establishes a second phase shift in the second waveguide, wherein a phase difference between the first phase shift and the second phase shift is approximately equal to π radians or an odd multiple of π radians.

26. The optical device according to claim 23, wherein a phase difference of approximately zero radians exists when the first waveguide and the second waveguide are not deformed and the light signal is directed into the second output.

27. The optical device according to claim 23, wherein a length of the first piezoelectric rib and a length of the second piezoelectric rib are equal and have a rib length L(π/2) corresponding to a π/2 radian shift in accordance with an equation:

$$L\left(\frac{\pi}{2}\right) = \frac{\alpha\lambda}{(K_x + K_y)},$$

where

α is a constant of proportionality approximately equal to 0.5, λ is the wavelength, $K_x$ and $K_y$ are non-dimensional coefficients related to the first plurality of mutually orthogonal strain component and the second plurality of mutually orthogonal strain component in the first waveguide and the second waveguide, respectively.

28. The optical device according to claim 22, wherein the first length $L_1$ and the second length $L_2$ are unequal, forming a path length difference that establishes a π radian phase difference between the first waveguide and the second waveguide.

29. The optical device according to claim 22, wherein the first length $L_1$ and the second length $L_2$ are unequal, forming a path length difference that establishes a π/2 radian phase difference between the first waveguide and the second waveguide.

30. The optical device according to claim 29, wherein the path length difference is approximately 250 nm.

31. The optical device according to claim 28, wherein the first waveguide deformation is caused by supplying the first actuator with a positive predetermined voltage and the second waveguide deformation is caused by supplying the second actuator with a negative predetermined voltage.

32. The optical device according to claim 31, wherein the first waveguide deformation induces a phase shift of approximately +π/4 in the first waveguide and the second waveguide deformation induces a phase shift of approximately −π/4 in the second waveguide causing a phase difference of π radians between the first waveguide structure and the second waveguide structure such that the light signal is directed into the first output.

33. The optical device according to claim 31, wherein the first waveguide deformation is caused by supplying the first actuator with a negative predetermined voltage and the second waveguide deformation is caused by supplying the second actuator with a positive predetermined voltage.

34. The optical device according to claim 33, wherein the first waveguide deformation induces a phase shift of approximately −π/4 in the first waveguide structure and the second waveguide deformation induces a phase shift of approximately +π/4 is the second waveguide structure causing a cancellation of the π/2 radian phase difference between the first waveguide and the second waveguide established by the path length difference to thereby direct the light signal into the second output.

35. The optical device according to claim 31, wherein the first waveguide and the second waveguide are not deformed causing the light signal to be split into substantially equal portions that are directed into the first output and the second output.

36. The optical device according to claim 31, wherein the first piezoelectric rib and the second piezoelectric rib have rib length L(π/4) corresponding to a π/4 radian shift in accordance with the equation:

$$L\left(\frac{\pi}{4}\right) = \frac{\alpha\lambda}{(K_x + K_y)},$$

where α is a constant of proportionality approximately equal to 0.25 and $K_x$ and $K_y$ are non-dimensional coefficients related to the first plurality of mutually orthogonal strain components and the second plurality of mutually orthogonal strain components in the first waveguide and the second waveguide, respectively.

37. The optical device according to claim 22, herein the first piezoelectric rib comprises:

a first outer piezoelectric strip disposed on an exterior side of the first waveguide a distance substantially equal to the first offset; and a first inner piezoelectric strip disposed on an interior side of the first waveguide a distance substantially equal to the first offset.

38. The optical device according to claim 37, wherein the second piezoelectric rib comprises:

a second outer piezoelectric strip disposed on an exterior side of the second waveguide structure a distance substantially equal to the second offset; and a second inner piezoelectric strip on an interior side of the second waveguide a distance substantially equal to the second offset, wherein a distance between the first inner piezoelectric strip and said second inner piezoelectric strip is substantially within a range between 500 microns to 1,000 microns.

39. The optical device according to claim 5, wherein the first actuator is a variable voltage source connected to the first piezoelectric rib for supplying a voltage proportional to an amount of the light signal being directed into the first output.

40. The optical device according to claim 39, wherein the voltage is variable in a continuous range between zero volts and a first predetermined voltage amount.

41. The optical device according to claim 40, wherein zero volts corresponds to a maximum attenuation of the light signal and the first predetermined voltage amount corresponds to a maximum transmission of the light signal.

42. The optical device according to claim 5, further comprising a groove etched between the first output and the second output for mechanically isolating the first output from the second output.

43. The optical device according to claim 5, wherein the first length $L_1$ and the second length $L_2$ have approximately a 200 micron path length difference, said path length difference induces a phase variation equal to:

wherein ΔL equals $L_1$–$L_2$ $$\Delta\Phi = \frac{2\pi}{\lambda}n\Delta L$$

44. The optical device according to claim 43, wherein a first light signal having a first wavelength is output when the first piezoelectric rib is not actuated, and a second light signal having a second wavelength is output when the first piezoelectric rib is actuated.

45. A method for directing a light signal having a wavelength λ into a first output or a second output of an optical device that includes a first waveguide having a first core connected to the first output, a refractive index n, a first length $L_1$, wherein the light signal is propagated by said first core in a direction of propagation, said method for directing a light signal comprising the steps of:

providing a first piezoelectric rib for generating a first plurality of mutually orthogonal strain components in the first waveguide, said first piezoelectric rib is disposed on said first waveguide at a first predetermined offset distance from said first core such that only a first component of said first plurality of mutually orthogonal strain components substantially exists in the first core, wherein first component is parallel to the direction of propagation;

providing a second waveguide disposed adjacent to the first waveguide having a second core connected to the second output that propagates the light signal in the direction of propagation, the refractive index n, and a second length $L_2$, and a second output; and actuating said first piezoelectric rib to thereby generate a first waveguide deformation causing said first plurality of mutually orthogonal strain components to be produced in the first waveguide.

46. The method according to claim 45, wherein the step of actuating the first piezoelectric rib induces a phase difference of π radians between the first waveguide and the second waveguide.

47. The method according to claim 45, wherein the light signal exits the second waveguide structure when the step of actuating the first piezoelectric rib is not performed.

48. The method according to claim 45, further comprising the steps of:

providing a second piezoelectric rib for generating a second plurality of mutually orthogonal strain components in the second waveguide, said second piezoelectric rib is disposed on the second waveguide at a second predetermined offset distance from the second core such that only a second component of said second plurality of mutually orthogonal strain components substantially exists in the second core, wherein said second component is parallel to the direction of propagation and actuating said second piezoelectric rib to thereby generate a second waveguide deformation causing said second plurality of mutually orthogonal strain components to be produced in the second waveguide.

49. The method according to claim 48, wherein the step of actuating the first piezoelectric rib includes supplying the first piezoelectric rib with a positive predetermined voltage and the step of actuating the second piezoelectric rib includes supplying the second piezoelectric rib with a negative predetermined voltage.

50. The method according to claim 49, wherein the step of actuating the first piezoelectric rib establishes a phase shift of approximately $-\pi/2$ radians in the first waveguide structure and the step of actuating the second piezoelectric rib establishes a phase shift of approximately $-\pi/2$ radians in the second waveguide structure.

51. The method according to claim 49, wherein a phase difference of π radians or an odd multiple of π radians is established between the first waveguide and the second waveguide causing the light signal to be directed into the first output.

52. The method according to claim 48, wherein there is no phase difference established between the first waveguide and the second waveguide when the first waveguide and the second waveguide are not deformed, and the light signal is directed into the second output.

53. The method according to claim 48, wherein the first length $L_1$ and the second length $L_2$ are unequal and have a path length difference that generates approximately a π/2 radian phase difference between the first waveguide structure and the second waveguide structure.

54. The method according to claim 53, wherein the step of actuating the first piezoelectric rib includes supplying the first piezoelectric rib with a predetermined positive voltage causing the light signal to be phase shifted approximately $+\pi/4$ radians in the first waveguide structure, and the step of actuating the second piezoelectric rib includes supplying the second piezoelectric rib with a negative voltage causing the light signal to be phase shifted approximately $-\pi/4$ radians in the second waveguide structure.

55. The method according to claim 32, wherein a phase difference of π radians or an odd multiply thereof exists between the first waveguide structure and the second waveguide structure causing the light signal to exit the optical device from the first waveguide structure.

56. The method according to claim 53, wherein the step of actuating the first piezoelectric rib includes supplying the first piezoelectric rib with a predetermined negative voltage causing the light signal to be phase shifted approximately $-\pi/4$ radians in the first waveguide structure and, the step of actuating the second piezoelectric rib includes supplying the second piezoelectric rib with a positive voltage causing the light signal to be phase shifted approximately $+\pi/4$ radians in the second waveguide structure.

57. The method according to claim 56, wherein the π/2 is cancelled and no phase difference exists between the first waveguide and the second waveguide and the light signal is directed into the second output.

58. The method according to claim 53, wherein the step of actuating the first piezoelectric rib and the step of actuating the second piezoelectric rib are not performed causing the light signal to be split into substantially equal portions that are directed into the first output and into the second output, respectively.

59. A method of fabricating an optical device on a substrate, said optical device being used for directing a light signal, said method of fabricating comprising the steps of:

disposing a waveguide core layer on the substrate and forming a first waveguide from said waveguide core layer, wherein said first waveguide structure includes a first core, a refractive index n, and a first length $L_1$;

forming a second waveguide structure from said waveguide core layer, wherein said second waveguide structure includes a second core, the refractive index n, and a second length $L_1$;

disposing a first piezoelectric rib on said first waveguide structure at a first predetermined offset distance from said first core, wherein said first predetermined offset distance minimizes a birefringence value in said first waveguide at a second predetermined offset distance from said second core, wherein said second predetermined offset distance minimizes a birefringence value in said second waveguide.

60. The method according to claim 59 wherein the step of disposing a first piezoelectric rib further comprises:

disposing a first outer piezoelectric strip on an exterior side of the first waveguide structure a distance substantially equal to the first offset; and disposing a first inner piezoelectric strip on an interior side of the first waveguide a distance substantially equal to the first offset.

61. The method according to claim 60, wherein the step of disposing a second piezoelectric rib further comprises:
   disposing a second outer piezoelectric strip on an exterior side of the second waveguide structure a distance substantially equal to the offset; and
   disposing a second inner piezoelectric strip on an interior side of the second waveguide a distance substantially equal to the offset.

62. The method according to claim 61, wherein the first outer piezoelectric strip, the second outer piezoelectric strip, the first inner piezoelectric strip, and the second inner piezoelectric strip each have a width substantially in the range between 50 microns and 200 microns.

63. The method according to claim 62, wherein a distance between the first inner piezoelectric strip and the second inner piezoelectric strip is substantially within a range between 500 microns and 3,000 microns.

64. The method according to claim 59, wherein the first piezoelectric rib or the second piezoelectric rib or both are fabricated from a piezoelectric material prepared with a substance or substances selected from the group consisting of:
   lead zirconate titanate (PZT) or zinc oxide (ZnO).

65. The method according to claim 59, wherein the first waveguide structure or the second waveguide structure or both are fabricated from a material prepared with a substance or substances selected from the group consisting of:
   silica, polymers, or copolymers.

66. The method according to claim 59, wherein the first waveguide structure has a first cross-sectional shape and the second waveguide structure has a second cross-sectional shape, wherein said first cross-sectional shape and said second cross-sectional shape are either square, rectangular, trapezoidal, circular, or semi-circular.

67. A method for selectively directing a light signal into a first output or a second output of an optical device that includes at least one waveguide having at least one core connected to the first output, wherein said light signal propagates along said at least one waveguide in a direction of propagation, said method for selectively directing a light signal comprising the steps of:
   providing at least one piezoelectric element for switching the light signal from the first output into the second output by inducing a plurality of mutually orthogonal strain components in the at least one waveguide, said at least one piezoelectric element being disposed on the at least one waveguide in a predetermined position such that only a first component of said plurality of mutually orthogonal strain components substantially exists in the at least one core, wherein said first component is a strain component aligned to said direction of propagation; and
   actuating said at least one piezoelectric element to thereby generate a deformation in the at least one waveguide causing said plurality of mutually orthogonal strain components to be produced in the at least one waveguide.

* * * * *